United States Patent [19]

Fukuda et al.

[11] Patent Number: 4,979,292

[45] Date of Patent: Dec. 25, 1990

[54] METHOD OF FORMING FILAMENT HARNESS

[75] Inventors: Michio Fukuda, Nishinomiya; Tsutomu Iida, Hisai; Naoki Kuroda, Ojima; Nobuyuki Itaya, Minamimachi, all of Japan

[73] Assignee: Sumitomo Wiring Systems, Ltd., Japan

[21] Appl. No.: 412,541

[22] Filed: Sep. 22, 1989

Related U.S. Application Data

[63] Continuation of Ser. No. 125,594, Nov. 25, 1987, abandoned.

[51] Int. Cl.[5] .......... H01R 43/04; B32B 5/08

[52] U.S. Cl. .......... 29/863; 29/56.6; 29/755; 29/861; 156/296; 156/433; 156/441

[58] Field of Search .......... 29/850, 861, 56.6, 755, 29/564.6, 863, 861; 156/296, 433, 441; 174/72 A, 717 F

[56] References Cited

U.S. PATENT DOCUMENTS

| | | | |
|---|---|---|---|
| 3,693,228 | 9/1972 | Logan | 29/755 X |
| 3,699,630 | 10/1972 | Tarbox et al. | 29/755 X |
| 3,907,007 | 9/1975 | Hobbs et al. | 29/56.6 X |
| 3,930,524 | 1/1976 | Tarbox | 29/755 X |
| 3,947,943 | 4/1976 | Kokubo et al. | 29/755 X |
| 4,388,142 | 6/1983 | Hembert | 29/755 X |
| 4,428,114 | 1/1984 | Teagno | 29/564.6 |
| 4,593,952 | 6/1986 | Keahey et al. | 29/755 X |
| 4,677,734 | 7/1987 | Bloch et al. | 29/755 |

OTHER PUBLICATIONS

IBM Tech Discl Bull, vol. 26, No. 8, Jan. 1984, pp. 4131–4132 by Herriford et al.

*Primary Examiner*—Carl E. Hall
*Assistant Examiner*—Carl J. Arbes
*Attorney, Agent, or Firm*—Jordan B. Bierman

[57] ABSTRACT

An apparatus and method for producing a filament harness which comprises feeding a plurality of strands in a downstream direction onto a support which receives the strands. There is a head which contacts the strands and a control means for causing relative motion between the support and the head to form the plurality of wires into a predetermined, desired pattern. In addition, the product produced by the method is also disclosed.

9 Claims, 3 Drawing Sheets

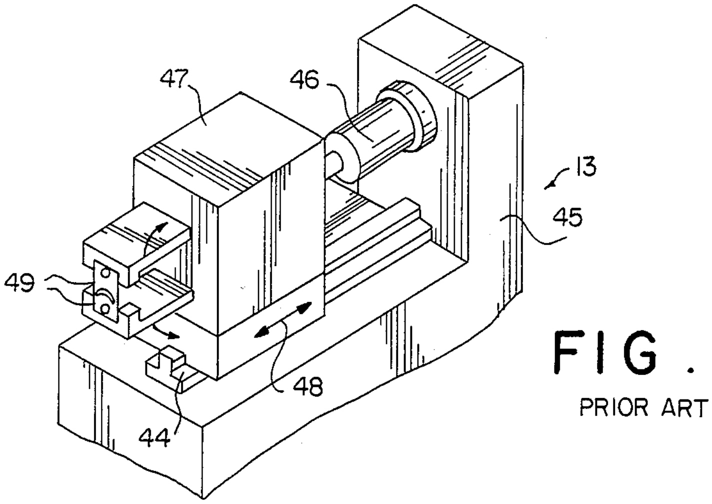
FIG. 8
PRIOR ART
FIG. 9
PRIOR ART
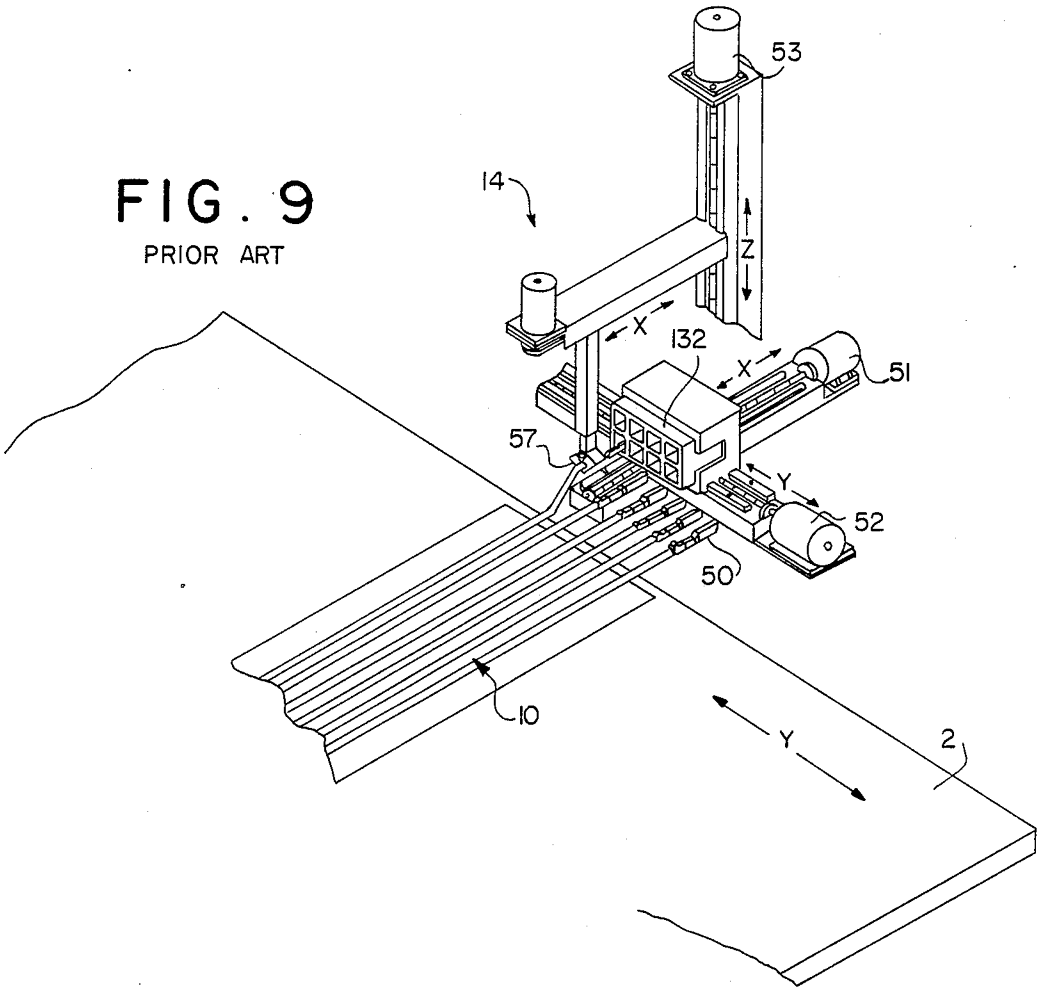

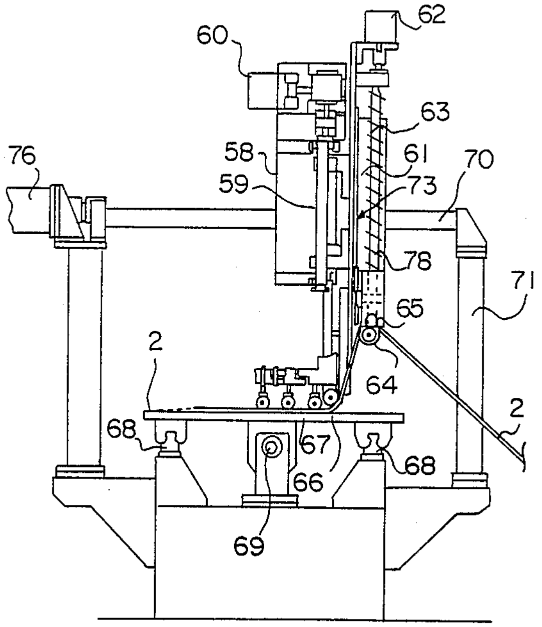
FIG. 17
PRIOR ART
FIG. 18
PRIOR ART
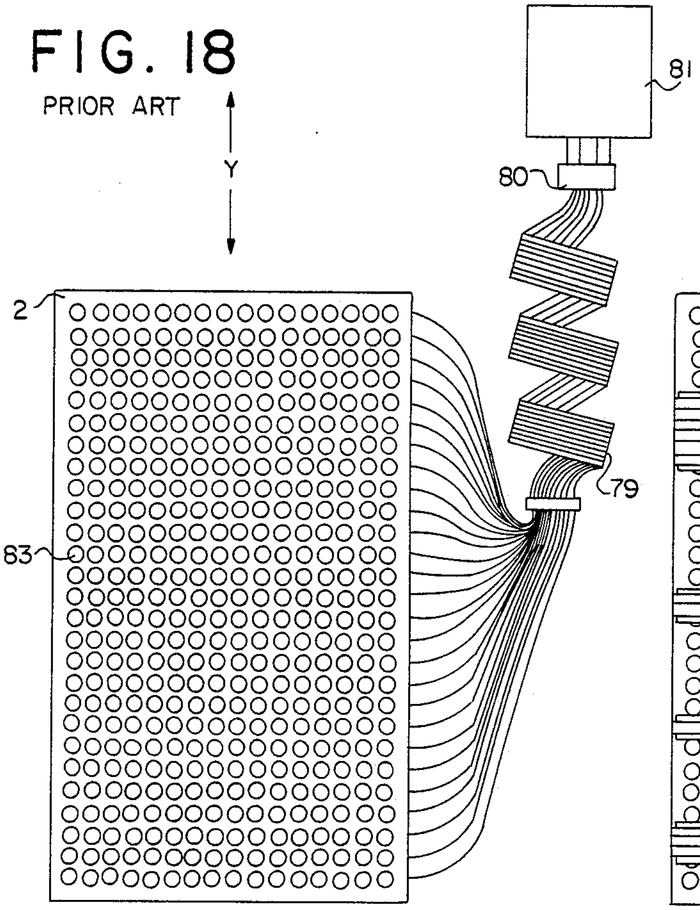
FIG. 19
PRIOR ART
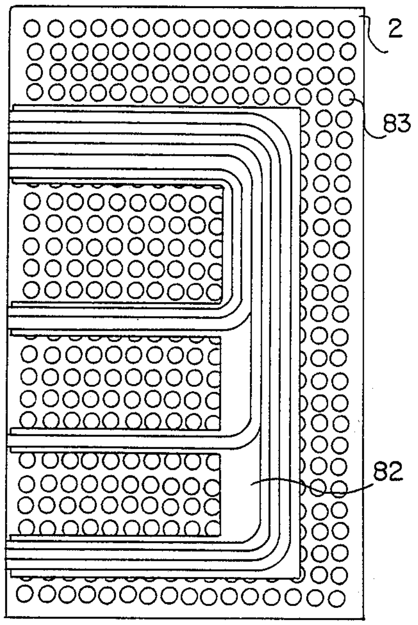

METHOD OF FORMING FILAMENT HARNESS

This application is a Continuation of application Ser. No. 07/125,594, filed Nov. 25, 1987, now abandoned.

The present invention is directed to a filament harness, a method of making it, and apparatus for use therefor. The present invention will be described with particular reference to wire harnesses for use in connection with motor vehicles. However, it will be understood that the invention is of such scope that it is applicable to other materials and other end uses.

FIELD OF THE INVENTION

This invention is directed to an improved method for the manufacture of wire harnesses used in automotive vehicles. In particular, it is useful in situations in which limited space is available. The invention finds particular application where insulated wires are placed in parallel alignment followed by bonding the wires together, thereby producing a harness having a predetermined, flattened shape.

THE PRIOR ART

Wiring harnesses for motor vehicles are made up of a number of elements. These include insulated electric wires, electric terminals which act as connectors, plastic housing for such connectors, grommets, and outer binding materials such as clamps and tapes. Since these harnesses must assume a specific, predetermined shape, their manufacture, in the past, has been difficult and slow.

More specifically, a design table having a plurality of guide pins set thereon is provided. Each wire making up the harness is cut to the approximate desired length and is laid by hand on the table around the guide pins. When all of the wires are in place, the completed set is bound together to produce an assembled, shapeless bundle.

As can easily be seen, this method is slow and cumbersome. Moreover, problems arise because of uneven stretching between guide pins and because the completed harness is extremely bulky. This limits its value for use in small spaces.

It is, therefore, among the objects of this invention, to provide a simple means for the manufacture of such harnesses by aligning the wires in parallel, whereby the bulk is substantially reduced. Furthermore, the product of the present invention may be formed into a predetermined pattern and the adjoining wires bonded by one another to provide a unitary whole.

BRIEF DESCRIPTION OF THE INVENTION

The present invention consists of a method for the production of wire harnesses, apparatus therefor, and the product thereof. The method comprises feeding a plurality of strands in a downstream direction onto a support. A head which guides the strands into the predetermined pattern is located above the support. In addition, there is a control means for moving the head and/or support relative to each other in order to produce a pattern of virtually any shape.

The apparatus comprises a source of a plurality of strands and feeding means for moving them in a downstream direction. The support, which is adapted to receive the strands from the feeding means, is provided with a head which is adapted to contact the strands. The head and the support are adapted to be controlled for movement relative to each other (and to the stream of wires) so that the predetermined pattern can be achieved. The head may be movable and the support stationary, the head may be stationary and the support movable, or both may be movable.

In a preferred form of the invention, both the head and the support are movable. One is moved in a transverse direction which is substantially perpendicular to the downstream direction and substantially parallel to the plane formed by the strands; the other is movable in a parallel direction which is substantially parallel to the plane of the strands and also substantially parallel to the downstream direction. By suitably controlling the movement of both the head and the support, the desired pattern can be obtained.

In a particular modification of the present invention, the head is rotatable about an axis perpendicular to the support. Thus, as the head and support are moved in their respective directions, rotation of the head will permit rounded corners to be obtained in the wire pattern.

In a further refinement of the present invention, the strands of wire, once they have been formed in the predetermined pattern, are bonded to one another. In particular, the bonding is carried out by heating the strands so that the surfaces of the individual wires fuse together. In this form of the invention, the head is provided with a heating means.

It has been found advantageous to construct the head of at least one roller which untangles the wires, aligns them, forms them into the desired pattern, and subsequently fuses them together.

Alternatively, the strands may be coated with adhesive in order to cause them to bond to one another. This form of the invention is particularly useful if there are no fusible surfaces to the wires.

It is of particular value that the strands are laid side-by-side in order to produce a very flat harness. The device and method of the present invention are particularly adapted to obtain this result.

If desired, electrical terminals can be placed on the starting ends and/or the back ends of the wires forming the harness. Similarly, insulation can be stripped from either or both ends as is required by the particular application of the invention.

DETAILED DESCRIPTION OF THE INVENTION

In the accompanying drawings, constituting a part hereof and in which like reference characters indicate like parts, FIG. 1 is a schematic plan view of the apparatus of the present invention;

FIG. 8 is the prior art insulation remover in perspective;

FIG. 9 is a perspective view of the prior art feeder;

FIG. 14 to 17 and 20 are detailed views of the head;

FIG. 18 is a plan view of a vacuum table before the wire harness has been formed thereon; and FIG. 19 is a view similar to that of FIG. 18 after the harness has been formed.

Figure 1:
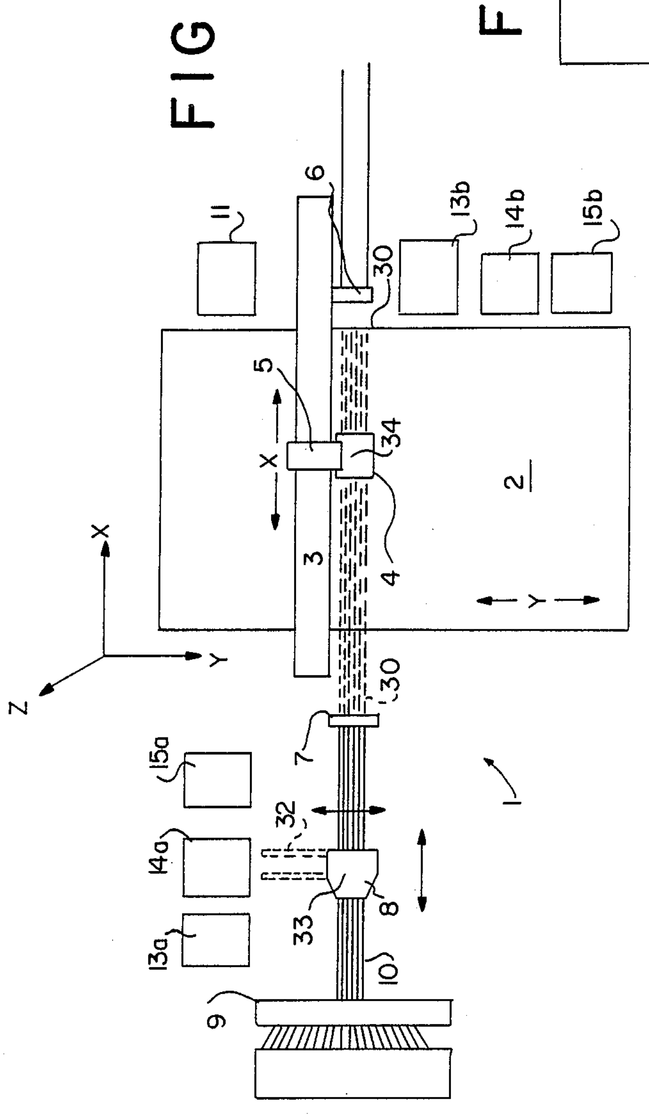

Apparatus 1 is provided with support 2 which is adapted for motion along axis Y. Above support 2 is head 4 which depends from hanger 5 which, in turn, is mounted on driving rod 3 for movement along axis X and for rotation about control axis 34.

Figure 6:
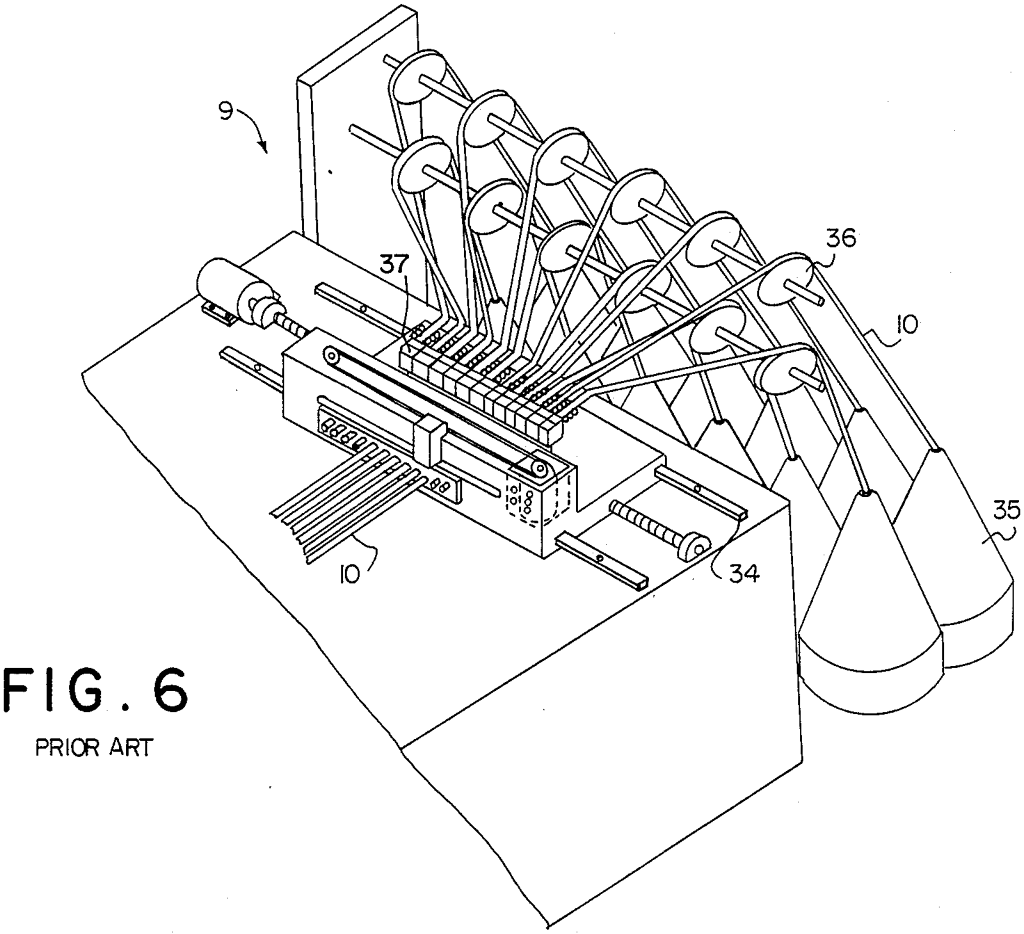
FIG. 6 PRIOR ART
FIG. 6 is a perspective schematic view of the source of the wires.

On the upstream side of support 2, there are provided source 9, clamp 8, and cutter 7. In addition, carrier 6 is adapted for movement parallel to axis X. Source 9, as shown in FIG. 6, comprises spools 35 which discharge wires 10 which, in turn, pass over spindles 36, through divider 37, and are thence lead to clamp 8.

Peripheral and optional equipment such as insulation removers 13*a* and *b*, terminal feeders 14*a* and *b*, terminal crimpers 15*a* and *b*, housing applicator 11, etc. is provided on the periphery of apparatus 1. Insulation removers 13 (see FIG. 8) comprise base 45 having block 47 slidably mounted on rail 44 for movement in directions 48 under the influence of actuator 46. Head 49 strips the ends of wires 10 in preparation for terminal attachment.

Terminal feeders 14 are shown in FIG. 9. Actuators 51, 52, and 53 operate to move the mechanism in one or more of three directions so that the end of wire 10 is properly aligned so as to receive terminal 50 thereon.

Figure 7:
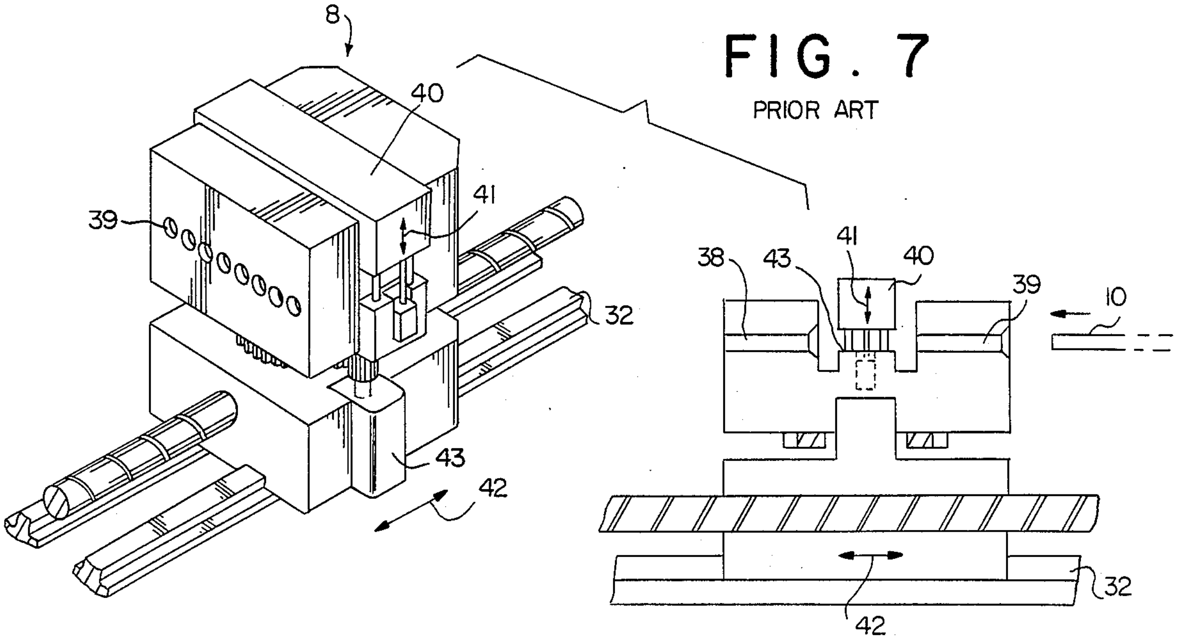
FIG. 7 PRIOR ART
FIG. 7 shows the prior art clamp in perspective and in section.

In operation, wires 10 are drawn from source 9 by clamp 8. As shown in FIG. 7, clamp 8 comprises block 40 adapted for vertical movement in the directions of arrows 41. Opening 39, leading to bores 38, receives wires 10 which, upon downward movement of block 40, are secured between block 40 and anvil 43. The clamp is also movable on rails 32 in the directions of arrows 42. In addition to its ability to move along axis X, clamp 8 is also capable of rotation about attaching axis 33. Thus, after clamp 8 has grasped wires 10 , it may be rotated in the direction of starting crimper 14*a* and moved on guide 32 so that the ends of wires 10 enter crimper 14*a*. The terminals are fed from starting terminal feeder 15*a* into crimper 14*a* and applied therein to the starting ends of wires 10.

Clamp 8 is then rotated back to its original position and moved downstream until the starting ends project beyond cutter 7. Carrier 6 then moves upstream to cutter and grips starting ends 30 of wires 10.

Figure 2:
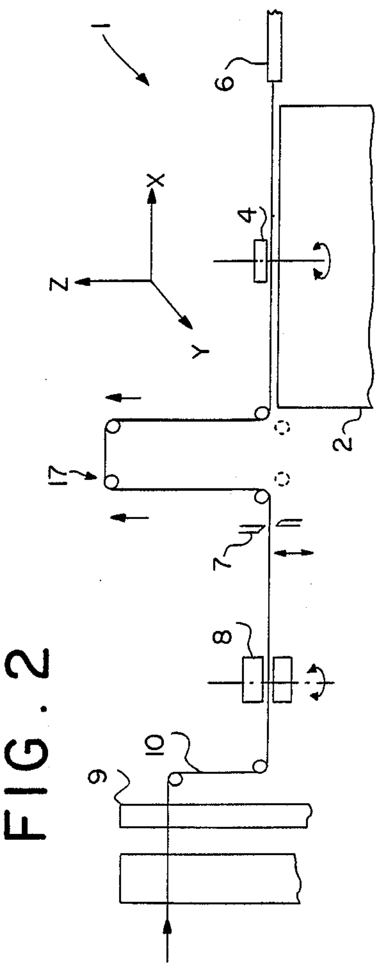
FIG. 2 is a schematic side view of the apparatus of the present invention.
Figure 11:
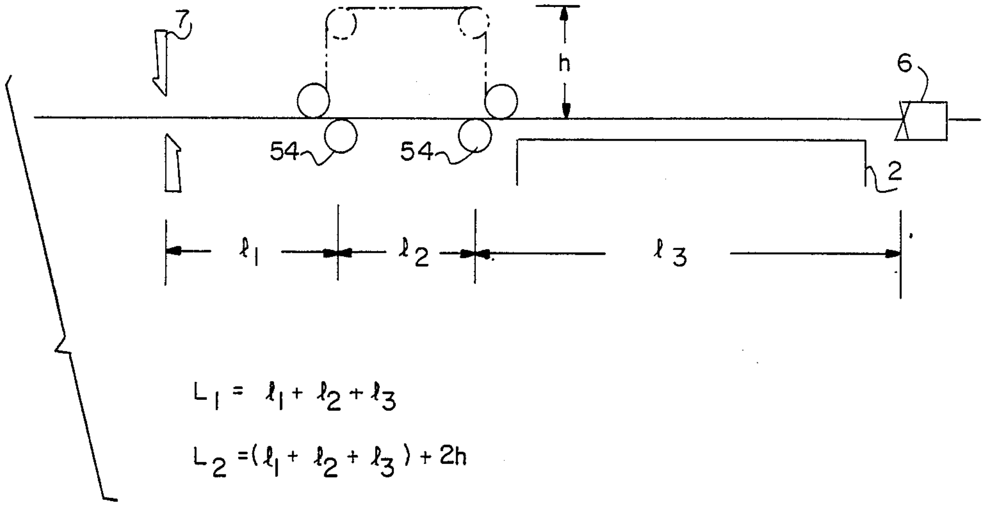
FIG. 11 PRIOR ART
FIG. 11 and 12 are schematic views of the prior art dancer.
Figure 12:
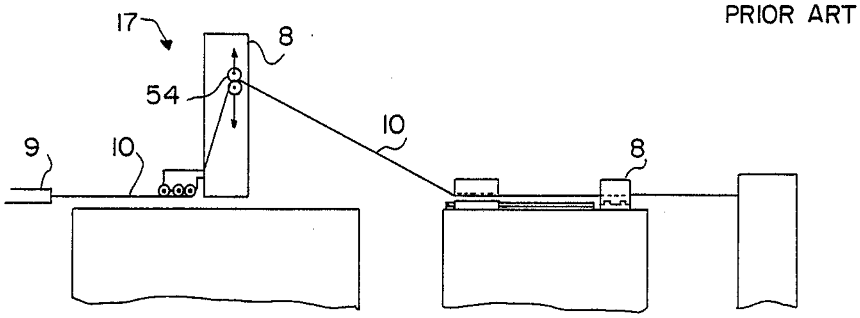
FIG. 12 PRIOR ART
Figure 13:
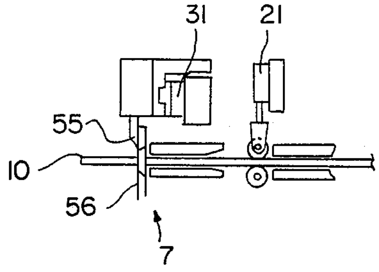
FIG. 13 PRIOR ART
FIG. 13 shows the prior art cutter schematically.
Figure 16:
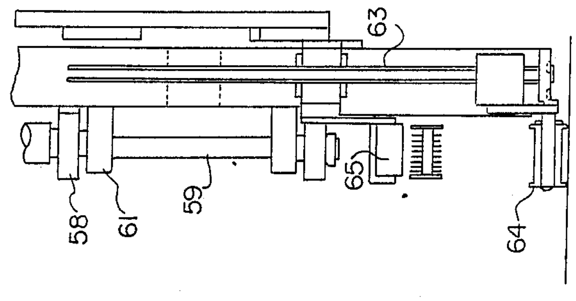
FIG. 16 PRIOR ART
Figure 15:
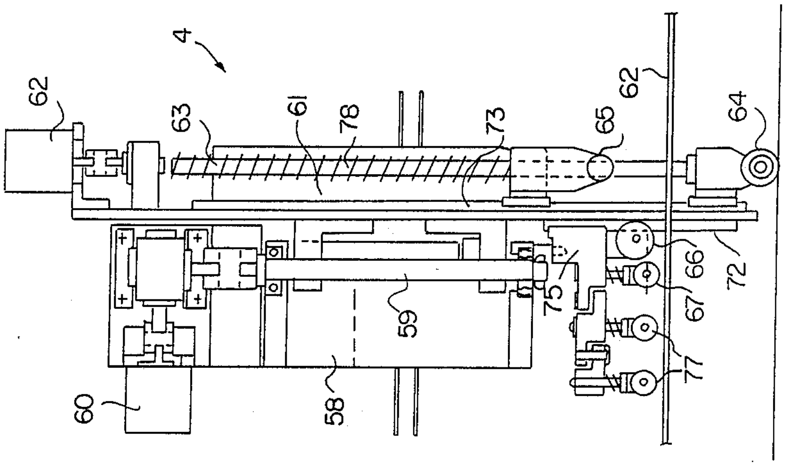
FIG. 15 PRIOR ART
Figure 20:
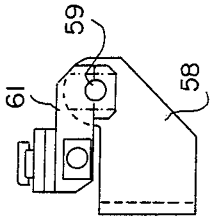
FIG. 20 PRIOR ART
Figure 14:
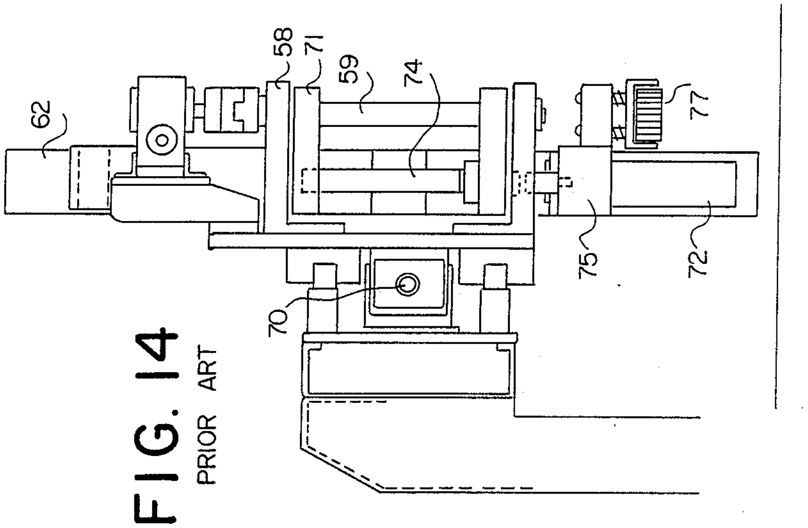
FIG. 14 PRIOR ART

Carrier 6 then moves downstream, and, in cooperation with movable rollers 54 of dancer 17 (see FIGS. 2, 11, and 12), measures out the length which is necessary to complete the desired pattern. Wire 10 is then severed by upper blade 55 and lower blade 56 of cutter 7 (see FIG. 13), and clamp 8 returns to its original position along axis X.

Support 2 and head 4 are then caused to move in accordance with the predetermined desired pattern by the control means (not shown). Head 4 aligns wires 10 and, by its interaction with support 2, forms wires 10 into the desired pattern.

Figure 3:
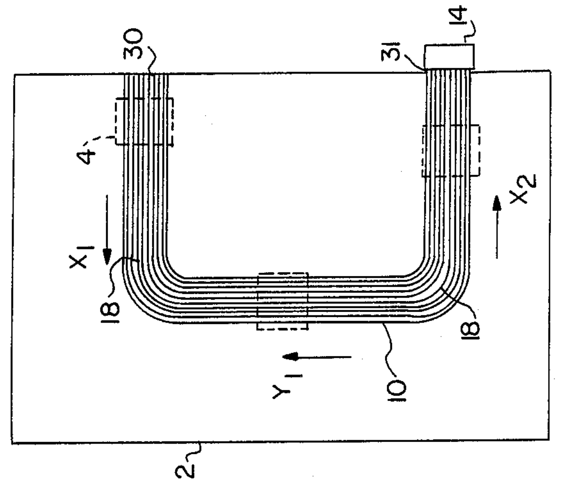
FIG. 3 is a plan view of the support after the wire harness has been formed thereon.

As can be seen in FIG. 3, the pattern may contain corners 18. In order to form these smoothly, head 4 is rotated, under the direction of the control means, about control axis 34. Advantageously, back ends 31 of wires 10 project slightly over the downstream edge table end 12. By appropriate movement of support 2, ends 31 are introduced into back terminal crimper 14*a*. There, in a manner analogous to the operation of starting terminal crimper -*a*, electrical terminals are affixed to wires 10. Should the use of the harness not require terminals on one or both ends, these corresponding elements and steps may be omitted. In similar fashion, insulation remover 13*b* may be used to strip any desired portions of ends 30 or 31. The connector housing is applied to the harness by housing applicator 11.

Figure 4:
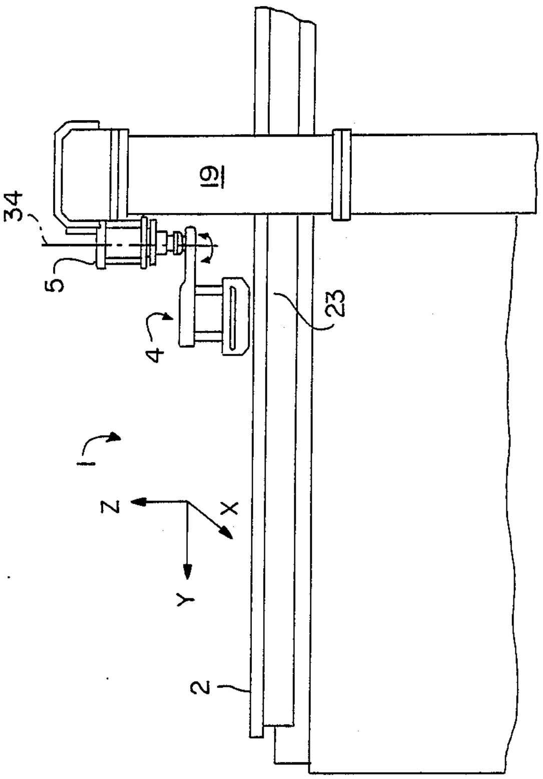
FIG. 4 is an enlarged schematic side view of the head.
Figure 5:
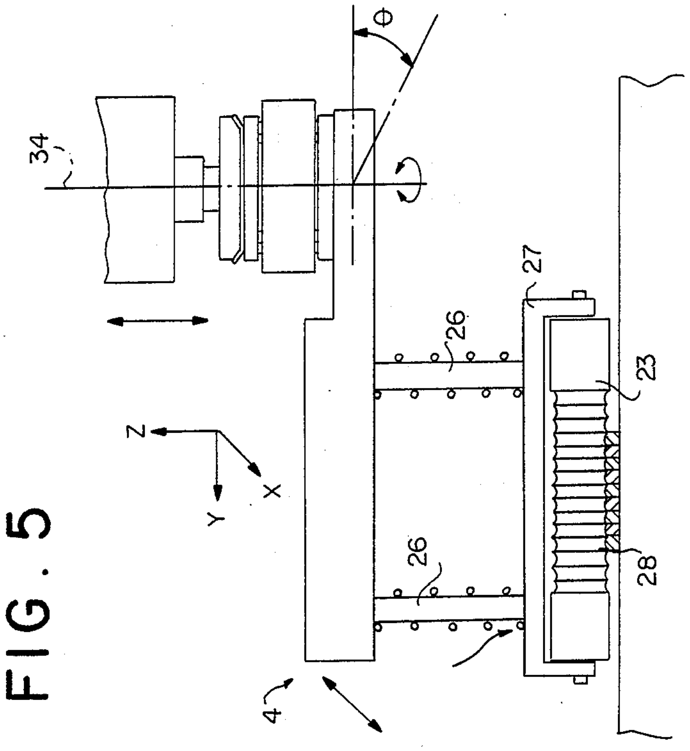
FIG. 5 is a side view, partly schematic and with portions broken away for clarity.
Figure 10:
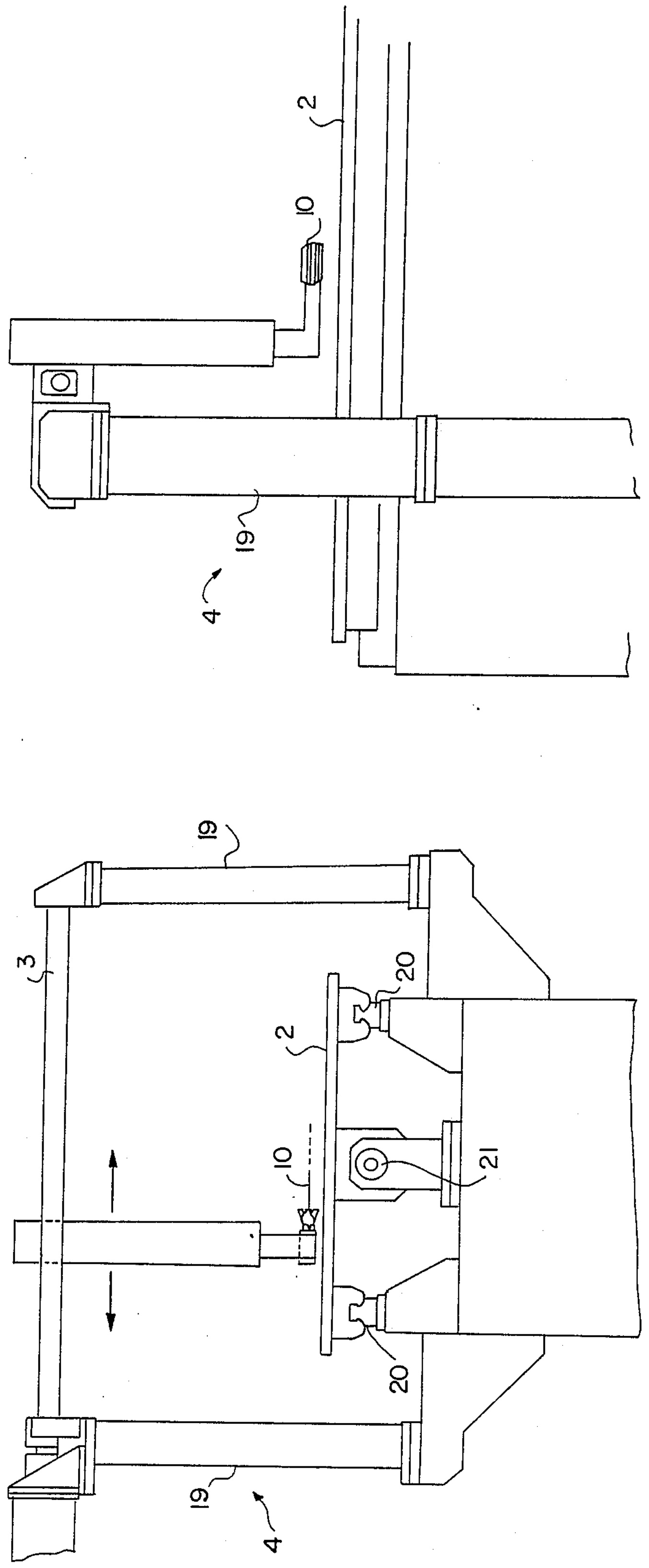
FIG. 10 PRIOR ART
FIG. 10 is an enlarged schematic side elevation and end view of the prior art head.

Referring to FIGS. 4, 5, and 10, the mechanical structure of head 4 is shown. Hanger 5 is located on driving rod 3 (which is supported by columns 19) for motion, in the direction of axis X. Depending therefrom is head 4 which advantageously comprises index roller 23 and aligning rollers (now shown). These rollers are mounted on holders 27 which, in turn, are attached to verticals 26. In a preferred form of the device, index roller 23 is provided with grooves 28 to aid in alignment of wires 10. Wires 10 are fed through a tube (not shown) onto support 2 and arranged in the appropriate pattern by the relative motions of support 2 and head 4.

Head 4 is shown in greater detail in FIGS. 14 to 17 and 20. Rotating frame 61 is mounted on hanger 58 at rotating axis 59. Threaded drive 63 effectuates vertical movement of wire holding roller 65 by rotation of threaded drive 63 powered by motor 62. Pilot roller 77 guides were rollers 66 and 67. One or more of these rollers is provided with a plurality of grooves, each adapted to receive a single wire 10. Head 4 is adapted for movement relative to supporting frame 71 on guide rails 72 and 73. Threaded drives 82 and 83 permit motion in two additional directions. Compression cylinder 74 is also used to accomplish vertical motion of the head and resilience is supplied by compression spring 78.

In a preferred form of the device, there is also provided double sided adhesive tape 82 which is wider than the width of the harness being formed. Tape 82 is located on support 2 in the desired pattern. The surfaces of wire 10 adhere to tape 82 until wires 10 are actually bonded together. Tape 82 then be removed and discarded.

In addition, support 2 may be provided with a plurality of openings 83 (see FIGS. 18 and 19) which are connected by flexible hose 79 through vacuum valve 80 to vacuum pump 81. The suction thus provided aids in retaining the harness in its predetermined position until it can be permanently secured. As an alternative, the vacuum may be used in place of adhesive tape 82 and would then constitute the only force holding the harness in position.

In order to accomplish the desired motion of support 2, there are provided rails 20 and traverse 21 (see FIG. 4). Thus, in accordance with the present invention, a relatively simple mechanism is provided for feeding the plural strands of wire onto the support, arranging them in the desired pattern, and binding them together so that the shape is maintained.

It is understood that, while only a limited number of embodiments of the present invention have been expressly disclosed, such modifications as would be apparent to the person of ordinary skill may be made without departing from either the scope or the spirit thereof. For example, when attaching terminals to the ends of the wires, the crimpers may move toward and away from the wire ends, the ends may move toward and away from the crimper, or both may be movable. Also, it is not necessary that the support and head move along axis which are perpendicular and parallel to the downstream direction. Any combination of movements which will enable the wires to be laid in the desired pattern may be used.

Thus, the present invention is to be broadly construed, and not to be limited except by the character of the claims appended hereto.

What we claim is:

1. A method for producing a filament harness, comprising the steps of:

drawing desired strands from a source having a plurality of strands;

feeding said drawn strands in a downstream direction along the axis X onto a support;

cutting said drawn strands into each of given lengths;

pushing said drawn strands on said support successively by a head which can move along the axis X and turn about the vertical axis parallel to the axis Z perpendicular to said support; and forming said drawn strands into a predetermined pattern on said support by selectively moving said head along the axis X and turning said head about the vertical axis by a given angle Θ and by selectively moving said support along the axix Y perpendicular to the axis X.

2. The method of claim 1 comprising applying terminals to at least one of a starting end and a back end.

3. The method of claim 1 wherein said strands are in side-by-side relationship, whereby said harness is substantially flat.

4. The method of claim 1 comprising heating said strands to fuse them to one another.

5. The method of claim 1 comprising applying adhesive to said strands to cause them to adhere to one another.

6. The method of claim 1 comprising softening the surfaces of said strands to cause them to fuse together.

7. The method of claim 1 comprising adhering said strands to an adhesive tape and removing said tape after said bonding.

8. The method of claim 7 wherein said tape has adhesive on both sides and is adhered to said support.

9. The method of claim 1 comprising measuring out a predetermined length of said strands by a dancer-roller pathway before said strands are placed on said support.

* * * * *